US009396095B2

(12) United States Patent
Wiggers et al.

(10) Patent No.: US 9,396,095 B2
(45) Date of Patent: Jul. 19, 2016

(54) SOFTWARE VERIFICATION

(71) Applicant: FUJITSU LIMITED, Kawasaki-shi, Kanagawa (JP)

(72) Inventors: Maarten Wiggers, San Jose, CA (US); Hiroaki Yoshida, Cupertino, CA (US)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/278,926

(22) Filed: May 15, 2014

(65) Prior Publication Data
US 2015/0331787 A1 Nov. 19, 2015

(51) Int. Cl.
*G06F 9/44* (2006.01)
*G06F 11/36* (2006.01)

(52) U.S. Cl.
CPC ........ *G06F 11/3676* (2013.01); *G06F 11/3684* (2013.01)

(58) Field of Classification Search
None
See application file for complete search history.

(56) References Cited

U.S. PATENT DOCUMENTS

| | | | | | |
|---|---|---|---|---|---|
| 5,355,479 | A * | 10/1994 | Torii | .................. | G06F 11/3604 717/126 |
| 6,578,196 | B1 * | 6/2003 | Bera | .................. | G06F 11/3624 717/126 |
| 6,817,013 | B2 * | 11/2004 | Tabata | .................. | G06F 8/443 717/127 |
| 6,947,957 | B1 * | 9/2005 | Lange | .................. | G06F 11/079 717/127 |
| 7,703,080 | B2 * | 4/2010 | Larsson | .............. | G06F 9/45508 717/126 |
| 7,844,951 | B2 * | 11/2010 | Chen | .................. | G06F 8/74 717/124 |
| 7,861,226 | B1 * | 12/2010 | Episkopos | .......... | G06F 11/3676 717/127 |
| 8,412,953 | B2 * | 4/2013 | Lerouge | .............. | G06F 11/1004 717/127 |
| 8,479,165 | B1 * | 7/2013 | Kawashima | ........ | G06F 11/3672 717/124 |
| 8,612,941 | B2 * | 12/2013 | Kumar | .......... | 717/131 |
| 8,719,799 | B2 * | 5/2014 | Adler | .................. | G06F 11/3676 717/127 |
| 8,863,096 | B1 * | 10/2014 | Bucur | .................. | G06F 9/5088 717/124 |

(Continued)

OTHER PUBLICATIONS

Yoo, et al., "Clustering Test Cases to Achieve Effective and Scalable Prioritisation Incorporating Expert Knowledge", 2009 ACM; [retrieved on Mar. 3, 2016]; Retrieved from Internet <URL:http://dl.acm.org/citation.cfm?id=1572296>;pp. 201-211.*

(Continued)

*Primary Examiner* — Xi D Chen
(74) *Attorney, Agent, or Firm* — Maschoff Brennan

(57) ABSTRACT

A method of verifying software may include receiving a portion of a software program that includes multiple functions. The method may also include clustering the functions into two or more clusters of functions and generating a symbolic driver for each of the clusters of functions such that multiple symbolic drivers are generated. The clusters of functions may be symbolically executed using the symbolic drivers to generate concrete test cases for the functions in the clusters. In response to the coverage of the symbolic execution of the clusters of functions being less than a particular coverage or a number of the concrete test cases being more than a particular number of concrete test cases, the method may include re-clustering the functions.

18 Claims, 7 Drawing Sheets

(56) References Cited

U.S. PATENT DOCUMENTS

| | | | |
|---|---|---|---|
| 8,966,461 B2* | 2/2015 | Gaster | G06F 8/443 717/126 |
| 2010/0005454 A1* | 1/2010 | Sankaranarayanan et al. | 717/127 |
| 2010/0083233 A1* | 4/2010 | Vanoverberghe et al. | 717/126 |
| 2011/0055638 A1* | 3/2011 | Lerouge | G06F 11/1004 717/126 |
| 2012/0179935 A1* | 7/2012 | Wang et al. | 714/32 |
| 2012/0311545 A1* | 12/2012 | Li et al. | 717/132 |
| 2014/0053134 A1* | 2/2014 | Wiggers | G06F 11/3608 717/124 |
| 2015/0331787 A1* | 11/2015 | Wiggers | G06F 11/3684 717/124 |

OTHER PUBLICATIONS

Avgerinos, et al., "Enhancing Symbolic Execution with Veritesting", 2014 ACM; [retrieved on Mar. 3, 2016]; Retrieved from Internet <URL:http://dl.acm.org/citation.cfm?id=2568293>;pp. 1083-1094.*

Leon, Podgurski, "A Comparison of Coverage-Based and Distribution-Based Techiques for Filtering and Prioritizing Test Cases"; 2003 IEEE; [retrieved on Mar. 3, 2016]; Retrieved from Internet <URL:http://ieeexplore.ieee.org/stamp/stamp.jsp?tp=&arnumber=1251065>;pp. 1-12.*

Wang, et al., "Empirical study of the effects of different profiles on regression test case reduction"; IET Software 2015; [retrieved on Mar. 3, 2016]; Retrieved from Internet<URL: http://ieeexplore.ieee.org/stamp/stamp.jsp?tp=&arnumber=7084275>;pp. 29-38.*

"Klee: Unassisted and Automatic Generation of High-Coverage Tests for Complex Systems Programs", C. Cadar, D. Dunbar, D. Engler. OSDI 2008.

Buchnik, E.; Ur, S., "Compacting regression-suites on-the-fly,"APSEC '97 and ICSC '97. Dec. 1997.

"Redundant State Detection for Dynamic Symbolic Execution",S. Bugrara, D. Engler. Usenix ATC 2013.

* cited by examiner

SOFTWARE VERIFICATION

FIELD

The embodiments discussed herein are related to software verification.

BACKGROUND

As usage of electronic devices increases, so does the number of software programs run on these devices. Typically when a software program is developed, it is verified to help assure that the software program satisfies all of the predetermined requirements for the software program. Developing and running concrete test cases to determine if a software program satisfies all predetermined requirements may be difficult and time consuming.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method of verifying software may include receiving a portion of a software program that includes multiple functions. The method may also include clustering the functions into two or more clusters of functions and generating a symbolic driver for each of the clusters of functions such that multiple symbolic drivers are generated. The clusters of functions may be symbolically executed using the symbolic drivers to generate concrete test cases for the functions in the clusters. In response to the coverage of the symbolic execution of the clusters of functions being less than a particular coverage or a number of the concrete test cases being more than a particular number of concrete test cases, the method may include re-clustering the functions.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
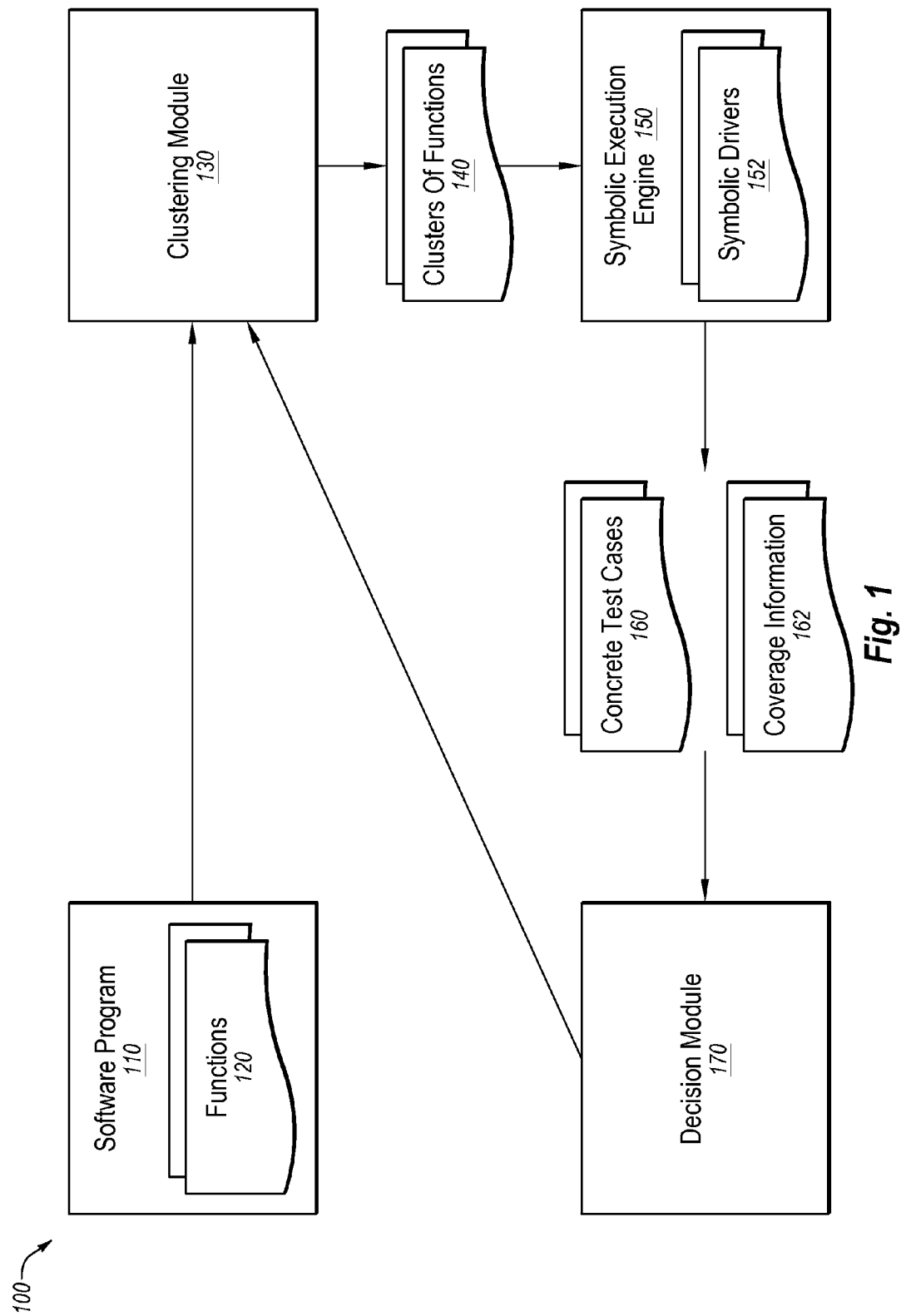
FIG. 1 is an example system for verifying software.

Some embodiments described herein relate to methods and systems of verifying a software program. The software program to be verified may include multiple functions that may form part of multiple execution paths within the software program. Along with the functions, various other elements may form part of the execution paths, including software statements, such as conditional statements, assignment statements; and other portions of the software code.

In some embodiments, the software program may be verified by clustering the functions of the software program into two or more clusters of functions. For each of the clusters of functions, a symbolic driver may be generated. The symbolic driver may include software code that is used by a symbolic execution engine to symbolically execute the functions of the software program. The clusters of the functions may be symbolically executed using the symbolic drivers to generate concrete test cases for the functions in the clusters.

After generating the concrete test cases, a coverage of the symbolic execution of the clusters of functions as output by the symbolic execution engine may be compared to a particular coverage of the clusters of functions. in response to the coverage being less than the particular coverage, the functions may be re-clustered, new symbolic drivers may be generated, and the software program may be symbolically executed again. Alternately or additionally, in response to a number of concrete test cases resulting from symbolically executing the clusters of functions being more than a desired number of concrete test cases, the functions may be re-clustered, new symbolic drivers may be generated, and the software program may be symbolically executed again. In some embodiments, in response to the number of concrete test cases resulting from symbolically executing the clusters of functions being less than a particular number of concrete test cases and the coverage being more than the particular coverage, the concrete test cases may be used to verify the software program.

In some embodiments, clustering the functions for symbolic execution may reduce a number of symbolic drivers that may be generated as well as the number of concrete test cases that may be generated. Generating symbolic drivers and executing concrete test cases may consume time and/or processing resource. As a result, reducing the number of symbolic drivers and concrete test cases that are generated may reduce the time and/or processing resources used to verify a software program.

In general, concrete execution is the execution of a software program using concrete values for various inputs of the software program. Concrete values and/or concrete inputs may include integers, real numbers, strings, characters, true/false, and other arbitrary real values. The concrete execution of a software program with a single set of concrete inputs may follow a single execution path through the software program. The concrete execution and the resulting output may be examined to determine if and/or when errors may occur within the software program or to perform other analyses of the software program.

Symbolic execution is a formal software verification technique that is derived from symbolic computation, which uses machines, such as computers or processors, to manipulate mathematical equations and expressions in symbolic form. To symbolically execute a software program, symbols representing sets of values replace individual concrete input values, such as numbers, strings, true/false, etc., for the software. The operations used to manipulate such variables are replaced with symbolic versions of the operations so that they may manipulate symbolic formulas and symbols instead of concrete values. The software program is then executed as in a normal execution. Systematic analysis may then be performed on the generated symbolic formulas to generate concrete test cases that may be used to execute the software program as explained previously and to verify the functionality of the software program.

Embodiments of the present invention will be explained with reference to the accompanying drawings.

FIG. 1 is an example system 100 for verifying a software program 110, arranged in accordance with at least one embodiment described herein. The system 100 may include a clustering module 130, a symbolic execution engine 150, and a decision module 170.

Figure 2A:
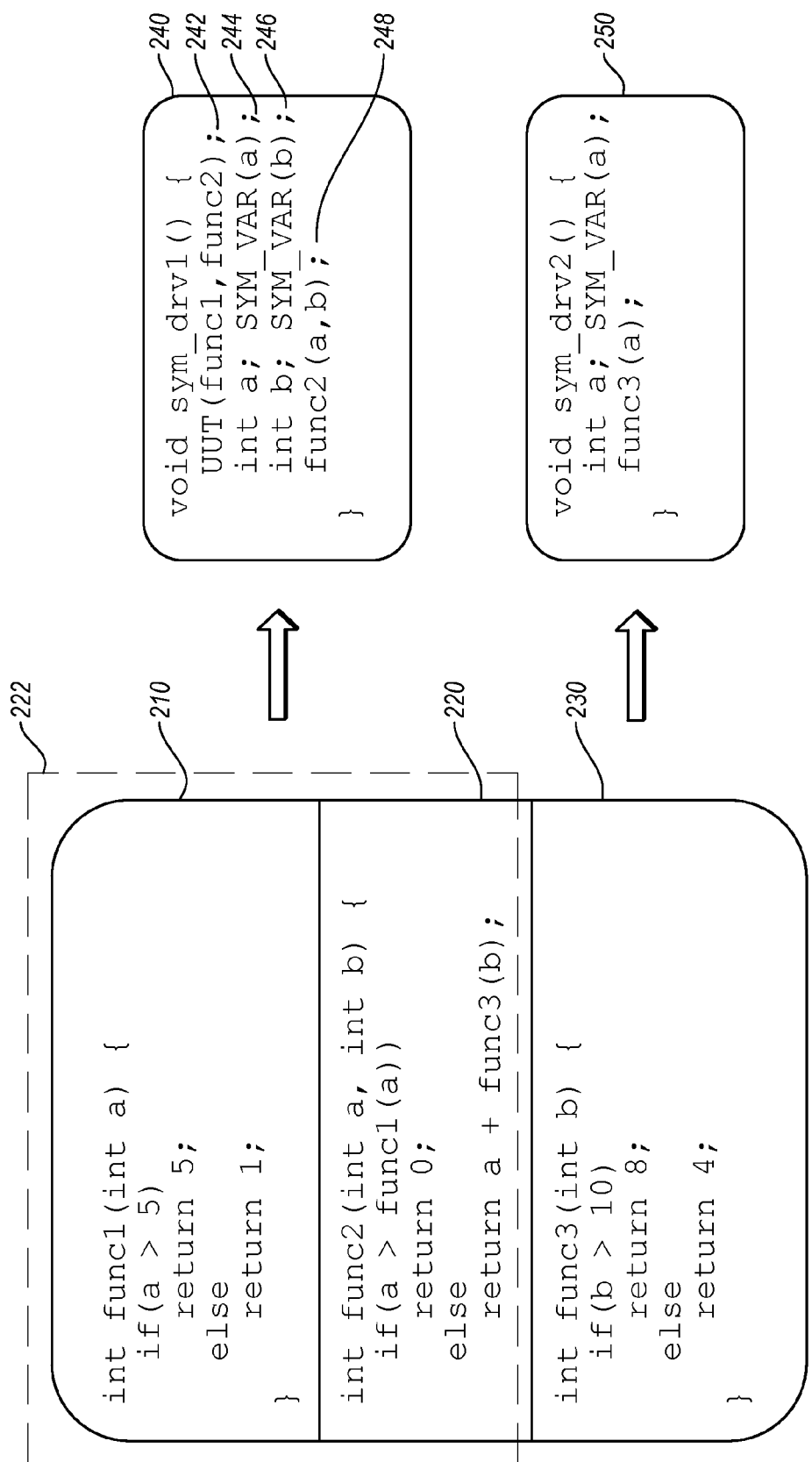
FIGS. 2A and 2B illustrate various example code segments used during software verification.

The software program 110 to be verified may include C++, C, C#, Java, or some other programming language that includes functions 120. Each of the functions 120 may include a named section of the software program 110 that performs a specific task. In some embodiments, the functions 120 may be referred to as procedures or routines. The functions 120 may be executed, e.g., called, from one or more locations within the software program 110. For example, the functions 120 may be executed within conditional statements, within assignments, within another one or ones of the functions 120, and/or within other portions of the software program 110. In some embodiments, the functions 120 may return one or more values or no values. In some embodiments, the functions 120 may change or otherwise affect variables separate from other portions of the software program 110 and/or the functions 120 may affect global or semi-global variables within the software program 110. FIG. 2A illustrates example first, second, and third functions 210, 220, and 230 that may be part of a software program, in accordance with at least one embodiment described herein. For example, the first, second, and third functions 210, 220, and 230 may be part of the software program 110 of FIG. 1.

Returning to a discussion of FIG. 1, the clustering module 130 may be configured to cluster the functions 120 into two or more clusters of functions 140 (herein after "clusters 140"). The functions 120 may be clustered by grouping the functions 120 into clusters. In some embodiments, each of the clusters 140 may include two or more of the functions 120. Alternately or additionally, some of the clusters 140 may include only one of the functions 120 or all of the functions 120 may be clustered in a single cluster 140. In some embodiments, each of the clusters 140 may have an equal number of the functions 120 or may have different numbers of the functions 120.

In some embodiments, the clustering module 130 may cluster the functions 120 using one or more clustering strategies. The clustering strategies may include or be based on calling dependencies between the functions 120, data variable dependencies between the functions 120, shared data variables contained in conditional statements, among other clustering strategies. For example, other clustering strategies may involve information gathered by executing the software program 110 using one or more concrete test cases. The information may indicate which of the functions 120 are included in individual execution paths through the software program 110 or are otherwise related. The clustering module 130 may cluster the functions 120 based on the gathered information.

When using the calling dependencies clustering strategy, the clustering module 130 may statically examine or may receive information about a static examination of the software program 110 that indicates the locations of the calls of the functions 120. In these and other embodiments, the clustering module 130 may cluster those functions 120 that execute or call other of the functions 120. For example, a first function may call a second function and a third function. The second function may call a fourth function. The clustering module 130 may cluster the first, second, third, and fourth functions into a cluster of functions when using the clustering strategy of calling dependencies between the functions 120.

When using the data variable dependencies clustering strategy, the clustering module 130 may statically examine or may receive information about a static examination of the software program 110 that indicates the functions 120 that write to and/or read from the same data variables. In these and other embodiments, the clustering module 130 may cluster those functions 120 that write to and/or read from the same data variable.

When using the shared data variables clustering strategy, the clustering module 130 may statically examine or may receive information about a static examination of the software program 110 that indicates the functions 120 with conditional statements that have the same data variable included therein. In these and other embodiments, the clustering module 130 may cluster those functions 120 with conditional statements that have the same data variable included therein.

In some embodiments, the clustering module 130 may cluster the functions 120 using a combination of one or more clustering strategies. For example, the clustering module 130 may cluster the functions 120 that have calling dependencies and that write to or read from the same data variable. Alternately or additionally, the clustering module 130 may cluster the functions 120 that have calling dependencies and that have shared data variables included in conditional statements. FIG. 2A illustrates the first and second functions 210 and 220 being clustered into a cluster based on the first function 210 being called by the second function 220 and on the first and second functions 210 and 220 both having the variable "a" in a conditional statement.

Returning to a discussion of FIG. 1, the clustering of the functions 120 does not alter the functions 120 or change the software program 110. Rather, the clustering of the functions 120 merely designates a relationship between functions 120 that is used by the symbolic execution engine 150.

The symbolic execution engine 150 may be configured to receive the clusters 140 and to generate one or more symbolic drivers 152 for each of the clusters 140. FIG. 2A illustrates a first symbolic driver 240 for the cluster 222 and a second symbolic driver 250 for the third function 230.

The symbolic drivers 152 may include segments of software code that guide how the symbolic execution engine 150 symbolically executes the clusters 140. For example, for a first cluster of functions (hereinafter "first cluster") of the clusters 140, the symbolic driver(s) 152 for the first cluster may instantiate symbolic variables for the variables used in the functions within the first cluster. Lines 244 and 246 of the first symbolic driver 240 of FIG. 2A illustrate an example of instantiating symbolic variables.

Returning now to FIG. 1, in some embodiments, the symbolic drivers 152 may have calls to one or more of the functions within their corresponding clusters 140. In particular, the symbolic drivers 152 may have a call to every function in their corresponding cluster 140 that is not called by another of the functions. For example, for a first cluster of functions (hereinafter "first cluster") of the clusters 140, if one of the functions in the first cluster is an entry function for the other functions in the first cluster, the symbolic driver(s) 152 for the first cluster may call the entry function and may not call other functions in the first cluster. An entry function for a cluster may be a function that when called and executed results in the call of the other functions in the cluster when all execution paths within the functions of the cluster are executed. Line 248 of the first symbolic driver 240 of FIG. 2A illustrates the calling of the second function 220, which, as illustrated, is an entry function with respect to the first function 210.

Returning now to FIG. 1, in some embodiments, the symbolic drivers 152 may also include function information about the functions 120 within their corresponding clusters 140. For example, for a first cluster of functions (hereinafter "first cluster") of the clusters 140, function information about functions in the first cluster may be included within the symbolic driver 152 that corresponds to the first cluster. The function information may direct the symbolic execution engine 150 to ignore alternate paths in functions that are not part of the first cluster but that may be called by functions in the first cluster. For example, in FIG. 2A, the first and second functions 210 and 220 are clustered in the cluster 222. The third function 230 is called by the second function 220 during execution of the second function 220. During symbolic execution of the cluster 222, the symbolic execution engine 150 may symbolically execute the third function 230 but when solving symbolic constraints generated by the symbolic execution may ignore alternate paths in the third function 230 that are not needed to execute all of the paths in the second function 220, such as the else statement in the third function 230. Line 242 of the first symbolic driver of FIG. 2A illustrates one notation that may indicate to a symbolic execution engine the functions within a cluster of functions. Further details about how a symbolic execution engine 150 may ignore alternate paths in functions not included in a cluster of functions but called by functions within the cluster of functions is described in U.S. patent application Ser. No. 14/278,783 entitled "PATH EXECUTION REDUCTION IN SOFTWARE PROGRAM VERIFICATION" filed on May 15, 2014, which is incorporated herein by reference in its entirety.

Returning now to FIG. 1, after generating the symbolic drivers 152 for the clusters 140, the symbolic execution engine 150 may symbolically execute the clusters 140 based on the symbolic drivers 152. In particular, the symbolic execution engine 150 may symbolically execute the clusters 140 as directed by the symbolic driver(s) 152 corresponding to the clusters 140.

Figure 2B:
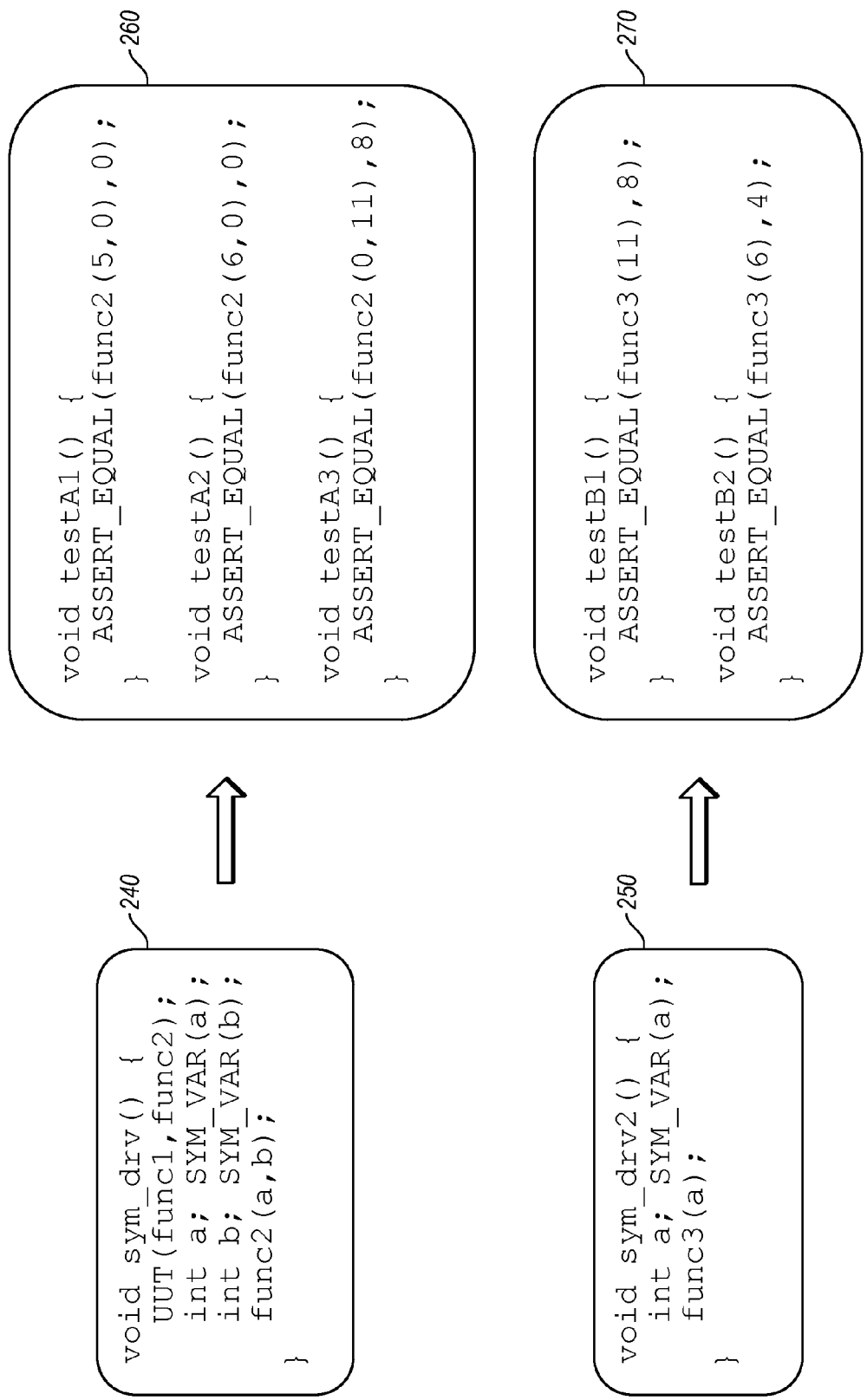

To symbolically execute the clusters 140, the symbolic execution engine 150 may generate symbolic formulas for the software statements within the functions 120 of the clusters 140. The symbolic execution engine 150 may solve each of the symbolic formulas, e.g., may determine the satisfiability of each of the functions 120, to generate concrete inputs. In some embodiments, the symbolic execution engine 150 may execute one symbolic driver 152 at a time to symbolically execute the corresponding one of the clusters 140. Alternately or additionally, the symbolic execution engine 150 may execute multiple symbolic drivers 152 in parallel. Based on the concrete inputs, the symbolic execution engine 150 may generate concrete test cases 160 that may be used to execute the functions 120 using concrete inputs and to verify the functionality of the functions 120. FIG. 2B illustrates first concrete tests cases 260 derived from the symbolic execution of the first symbolic driver 240 and second concrete tests cases 270 derived from the symbolic execution of the second symbolic driver 250.

Returning now to FIG. 1, the symbolic execution engine 150 may be further configured to generate coverage information 162 that indicates an amount of the software program 110 that is symbolically executed by the symbolic execution engine 150. In some embodiments, the coverage information 162 may be based on a number of lines executed by the symbolic execution engine 150. For example, the coverage information 162 may include the number of lines of the software program 110 symbolically executed as a percentage of the total number of lines of the software program 110 or may otherwise be based on the number of lines executed. Alternately or additionally, the coverage information 162 may be based on a number and/or percentage of conditional states, functions, and/or classes executed by the symbolic execution engine 150. For example, the coverage information 162 may include the number of conditional states, functions, and/or classes executed and/or a percentage of the number of conditional states, functions, and/or classes executed as a percentage of the total number of conditional states, functions, and/or classes in the software program 110.

The concrete test cases 160 and the coverage information 162 may be provided to the decision module 170. The decision module 170 may be configured to determine whether to re-cluster the functions 120 by the clustering module 130 and symbolically execute the re-clustered functions. The decision module 170 may determine when to re-cluster the functions 120 based on the number of the concrete test cases 160 and the coverage information 162. In particular, the decision module 170 may determine to re-cluster the functions 120 when the number of the concrete test cases 160 is more than a particular test case number and/or the coverage information 162 indicates that the coverage is less than a particular coverage.

The particular test case number may be determined based on metrics of the software program 110, such as a size, complexity, or number of functions of the software program 110, input from a user, processing capabilities for processing the concrete test cases 160, other metrics, or some combination thereof. For example, when the processing resources, the processing power, and/or the processing time to execute the concrete tests cases 160 is limited, reducing the number of concrete test cases 160 may reduce the processing time, the processing power, and/or the processing resources that may be used to execute the concrete test cases 160.

The coverage information 162 may be determined based on the metrics of the software program 110, an intended use of the software program, input from a user, and/or other metrics. For example, when the software program 110 is very large, it may be assumed that some of the software program 110 is dead code, such as 15 to 25% of the software program 110. As a result, the particular coverage may be set at 70 or 80 percent to account for dead code of the program.

When the decision module 170 determines that the number of concrete test cases 160 is more than a particular test case number and/or the coverage information 162 indicates that the coverage is less than a particular coverage, the decision module 170 may indicate to the clustering module 130 that the functions 120 be re-clustered.

In some embodiments, the decision module 170 may indicate to the clustering module 130 how to re-cluster the functions 120 based on the number of concrete test cases 160 and the coverage information 162. For example, in response to the coverage of the clusters 140 as indicated by the coverage information 162 being less than the particular coverage and the number of the concrete test cases 160 being less than the particular number of concrete test cases, the decision module 170 may direct the clustering module 130 to re-cluster the functions 120 by forming more clusters of functions than the current number of the clusters 140. The decision module 170 may direct the clustering module 130 to form more clusters of functions by dividing one or more of the clusters 140. In some embodiments, the clustering module 130 may re-cluster the functions 120 to generate more clusters 140 based on applying different clustering strategies or more stringently applying a clustering strategy. For example, during a first iteration, the clustering module 130 may have applied a data variable dependencies strategy and clustered the functions 120 based on the functions 120 having one data variable that is dependent among the functions 120. During a second iteration, the clustering module 130 may apply the data variable dependencies strategy, but may cluster the functions 120 based on the functions 120 having two data variables that are dependent among the functions 120.

As another example, in response to the coverage of the clusters 140 as indicated by the coverage information 162 being more than the particular coverage and the number of the concrete test cases 160 being more than the particular number of concrete test cases, the decision module 170 may direct the clustering module 130 to re-cluster the functions 120 by forming fewer clusters of functions than a current number of the clusters 140. The clustering module 130 may form fewer clusters of functions by combining the clusters 140 or combining portions of the clusters 140 with other of the clusters 140. In some embodiments, the clustering module 130 may re-cluster the functions 120 to generate fewer clusters of functions based on applying different clustering strategies or more loosely applying a clustering strategy. For example, during the first iteration, the clustering module 130 may have applied a data variable dependencies strategy and clustered the functions 120 based on the functions 120 having two or more data variables that are dependent among the functions 120. During the second iteration, the clustering module 130 may apply the data variable dependencies strategy, but may cluster the functions 120 based on the functions 120 having one data variable that is dependent among the functions 120.

As another example, in response to the coverage of the symbolic execution of the clusters 140 as indicated by the coverage information 162 being less than the particular coverage and the number of the concrete test cases 160 being more than the particular number of concrete test cases, the decision module 170 may direct the clustering module 130 to re-cluster the functions 120 using a different clustering strategy during a subsequent iteration than during the current iteration.

Clustering the functions 120 as described above may reduce a number of the concrete test cases 160 that may be used to verify the software program 110. For example, in some known systems, a symbolic driver is generated for each function within a software program. The symbolic driver is executed and concrete test cases are generated for each of the functions. Generating concrete test cases separately for each function may result in multiple functions being tested multiple times with different inputs. For example, if concrete test cases are separately generated for each of the first and second functions 210 and 220 of FIG. 2A, then two concrete test cases may be generated for each of the first and second functions 210 and 220, resulting in four concrete test cases. In contrast, using the system 100 described in FIG. 1, only three concrete test cases are generated. Having fewer concrete test cases reduces the processing time and/or processing resources to verify the software program 110 with the concrete test cases.

Additionally, in some known systems, the systems may cull the concrete test cases after the concrete test cases are generated to attempt to remove redundant concrete test cases. In contrast, the system 100, as described, may cluster the functions 120 of the software program 110 and may symbolically execute the functions 120 based on the clusters 140 to reduce the number of the concrete test cases 160 that are generated. Reducing the number of concrete test cases that are generated may also reduce a number of redundant concrete test cases.

Furthermore, by clustering the functions 120, the number of symbolic drivers 152 that may be generated may be reduced. Reducing the number of symbolic drivers 152 may also reduce the processing time and/or the processing resources that may be used to verify the software program 110.

Modifications, additions, or omissions may be made to the system 100 without departing from the scope of the present disclosure. For example, the system 100 may include other components or modules than those illustrated. Furthermore, the software code portions illustrated in FIGS. 2A and 2B are provided by way of example and are not limiting in anyway.

Figure 3A:
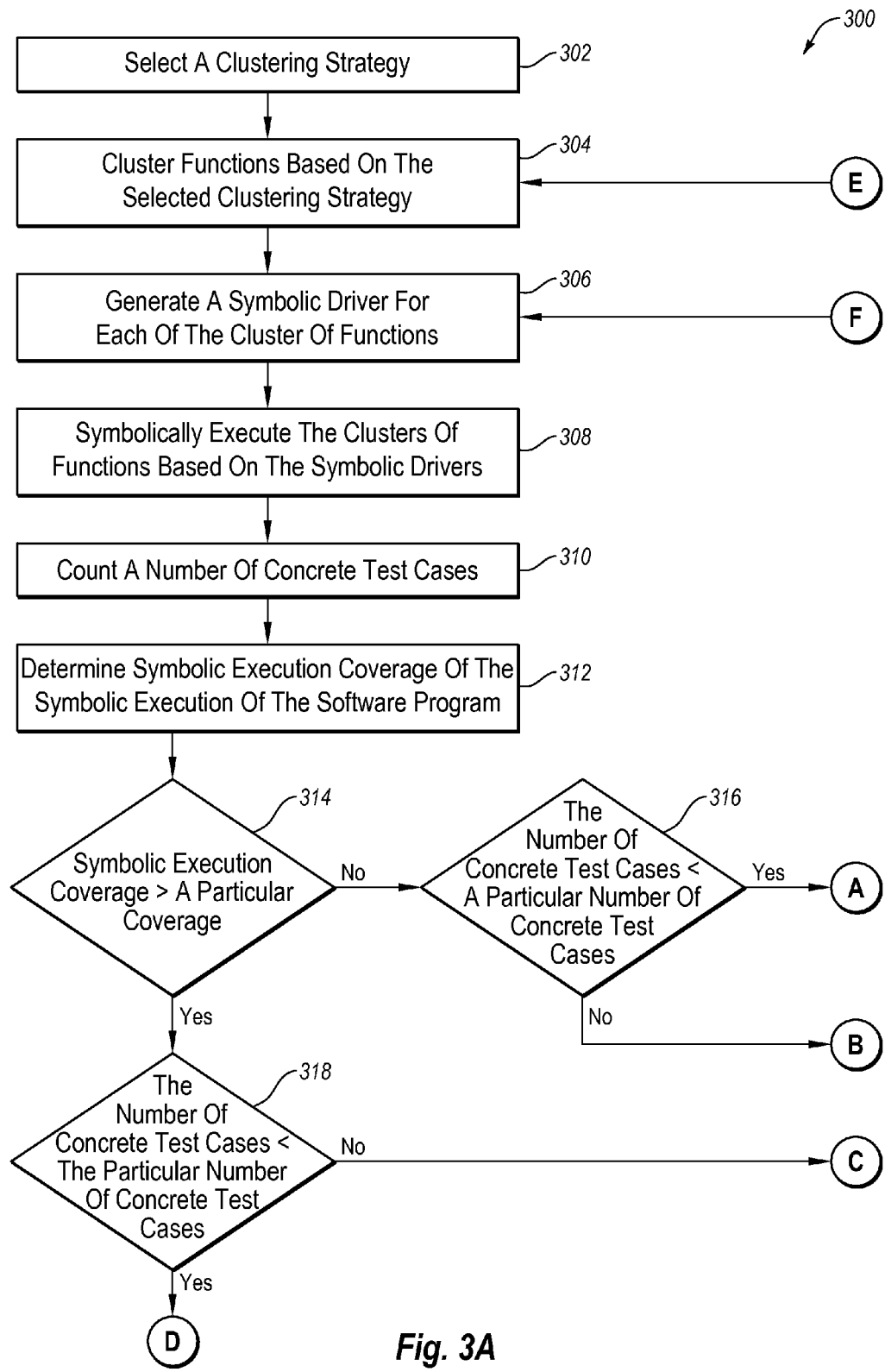
FIGS. 3A and 3B illustrate a flow chart of an example method of verifying software.
Figure 3B:
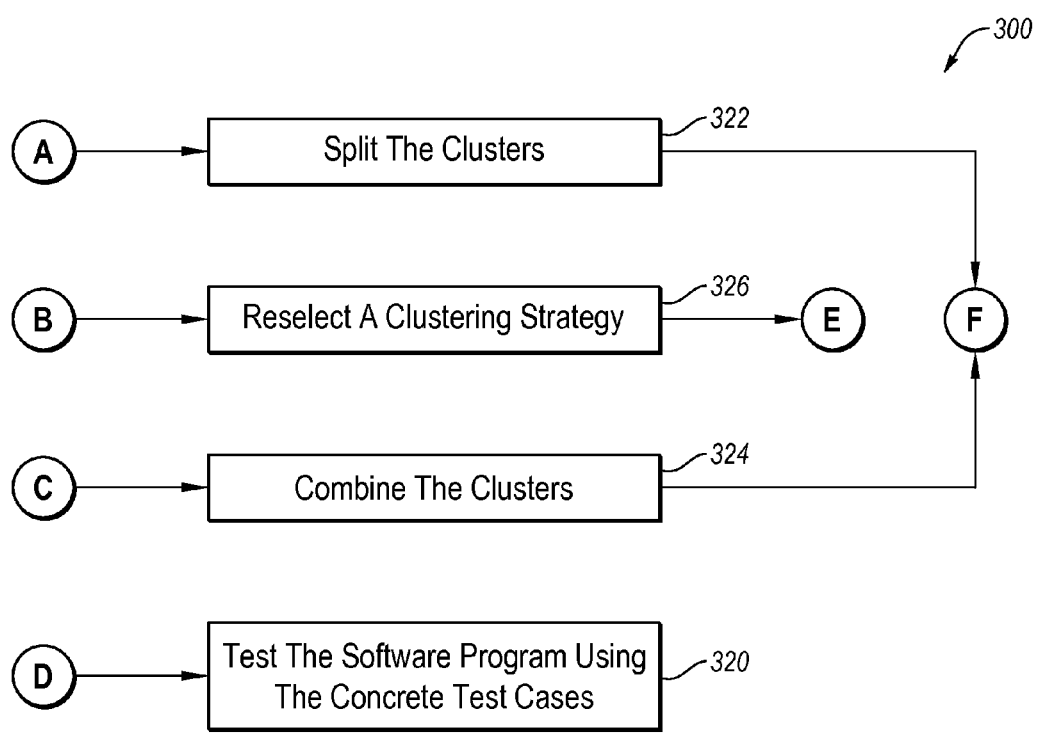

FIGS. 3A and 3B illustrate a flow chart of an example method 300 of testing software, arranged in accordance with at least some embodiments described herein. The method 300 may be implemented, in some embodiments, by a system, such as a system 100 or 400 of FIGS. 1 and 4. For instance, a processor 420 of the system 400 of FIG. 4 may be configured to execute computer instructions to perform operations for testing software as represented by one or more of blocks 302, 304, 306, 308, 310, 312, 314, 316, 318, 320, 322, 324, and/or 326 of the method 300. Although illustrated as discrete blocks, various blocks may be divided into additional blocks, combined into fewer blocks, or eliminated, depending on the desired implementation.

The method 300 may begin at block 302, where a clustering strategy for clustering functions of a software program may be selected. The clustering strategy may be a basis for clustering or grouping the functions of the software program together. The clustering strategies that may be selected may include calling dependencies between the functions, data variable dependencies between the functions, shared data variables contained in conditional statements in the functions, among other clustering strategies. For example, other clustering strategies may involve information gathered by executing the software program using one or more concrete test cases. The information may indicate which of the functions of the software program are included in individual execution paths through the software program 110 or are otherwise related. This clustering strategy may involve clustering the functions based on the information. For example, functions that are included in an individual execution path may be clustered together.

In some embodiments, the clustering strategy may be selected randomly from available clustering strategies. Alternately or additionally, the clustering strategy may be selected based on an analysis, such as a static analysis of the software program. The information from the analysis of the software program may be used to select the clustering strategy. The information may include: a number of lines of the software program; a number of functions of the software program; a number of interdependencies between functions in the software program, including a number of functions that call other functions; a number of functions that share variables; among other factors.

In some embodiments, the clustering strategy may be selected by identifying a previously verified software program that is analogous to the software program to be verified. After identifying the previously verified software program that is analogous to the software program to be verified, the clustering strategy used for the previously verified software program may be selected. In these and other embodiments, the previously verified software program may have been previously clustered, symbolically executed to generate second concrete test cases, and re-clustered until a second coverage of the symbolic execution of the previously verified software program is more than a second particular coverage and a second number of the second concrete test cases is less than a second particular number of concrete test cases.

In some embodiments, the clustering strategy applied to the previously verified software program may be selected when a number of times that the previously verified software program was re-clustered is less than a particular number of iterations. The particular number of iterations may be selected randomly, by a user of a system that verifies the software program, based on processing time to verify the software program, and/or processing resources available to verify the software program, among other metrics or information.

In some embodiments, the software program may be determined to be analogous to the previously verified software program based on similarities in one or more metrics of the software program and the previously verified software program. The metrics may include line count, cyclomatic complexity, instruction path length, connascene, and halstead complexity, among other software metrics.

In block 304, functions of the software program may be clustered based on the selected clustering strategy. Clustering the functions may include associating the functions within each cluster. Clustering the functions may not change the functions or the software program.

In block 306, a symbolic driver for each of the clusters of functions may be generated. The symbolic drivers may be segments of software code that guide how a symbolic execution engine symbolically executes the clusters of functions.

In block 308, the software program, including the clusters of functions, may be symbolically executed based on the symbolic drivers. The software program may be symbolically executed using a symbolical execution engine. In some embodiments, symbolically executing the software program may result in various concrete test cases being generated. The concrete test cases may be generated based on solutions for symbolic expressions generated during the symbolic execution of the clusters of functions.

In block 310, a number of concrete test cases generated based on the symbolic execution of the clusters of functions may be counted. In block 312, coverage information of the symbolic execution of the clusters of functions may be determined. The coverage may indicate an amount of the software program that is symbolically executed in block 308.

In block 314, it may be determined if the coverage of the software program is greater than a particular coverage. The particular coverage may be based on metrics of the software program, an intended use of the software program, input from a user, and/or other metrics. In response to the coverage being greater than the particular coverage, the method 300 may proceed to block 318. In response to the coverage being not greater than the particular coverage, the method 300 may proceed to block 316.

In block 316, it may be determined if the number of concrete test cases is less than a particular number of concrete test cases. The particular number of concrete test cases may be determined based on metrics of the software program, such as a size, a complexity, or a number of functions of the software program, input from a user, processing capabilities for processing the concrete test cases, other metrics, or some combination thereof. When the number of concrete test cases is less than the particular number of concrete test cases, the method 300 may proceed to block 322. When the number of concrete test cases is not less than the particular number of concrete test cases, the method 300 may proceed to block 326.

In block 318, it may be determined if the number of concrete test cases is less than the particular number of concrete test cases. When the number of concrete test cases is less than the particular number of concrete test cases, the method 300 may proceed to block 320. When the number of concrete test cases is not less than the particular number of concrete test cases, the method 300 may proceed to block 324.

In block 320, the software program may be tested using the concrete test cases. In some embodiments, a number of iterations that the method 300 is performed before the software program is tested using the concrete test cases at block 320 may be noted. In particular, a number of re-clusterings of the functions of the software program until the coverage is greater than the particular coverage and the number of concrete test cases is less than the particular number of concrete test cases may be noted. Additionally, the last clustering strategy that is selected may be noted. The last selected clustering strategy and the number of iterations may be used during other iterations of the method 300 to select a clustering method for another software program.

In block 322, one or more of the clusters of functions may be split and the functions in the split cluster of functions may be dispersed among the remaining clusters of functions. By splitting one or more clusters of functions, there may be more clusters of functions in a current iteration than a number of the clusters of functions during a preceding iteration of the method 300. After splitting the one or more clusters of functions, the method 300 may proceed to block 306 and the method 300 may continue as already described above.

In block 324, one or more of the clusters of functions may be combined with others of the functions of clusters. By combining one or more clusters of functions, there may be fewer clusters of functions in the current iteration than a number of the clusters of functions during the preceding iteration of the method 300. After splitting the one or more clusters of functions, the method 300 may proceed to block 306 and the method 300 may continue as already described above.

In block 326, a different clustering strategy may be selected than the clustering strategy selected in block 302. The method 300 may then proceed to block 304 and the method 300 may continue.

One skilled in the art will appreciate that, for this and other processes and methods disclosed herein, the functions performed in the processes and methods may be implemented in differing order. Furthermore, the outlined acts and operations are only provided as examples, and some of the acts and operations may be optional, combined into fewer acts and operations, or expanded into additional acts and operations without detracting from the essence of the disclosed embodiments.

For example, in some embodiments, the method 300 may end when a number of iterations of the method 300 is greater than a particular number of iterations. The particular number of iterations may be based on a processing time, processing power, and/or processing resources available to perform the method; user input; and/or some other metric.

Figure 4:
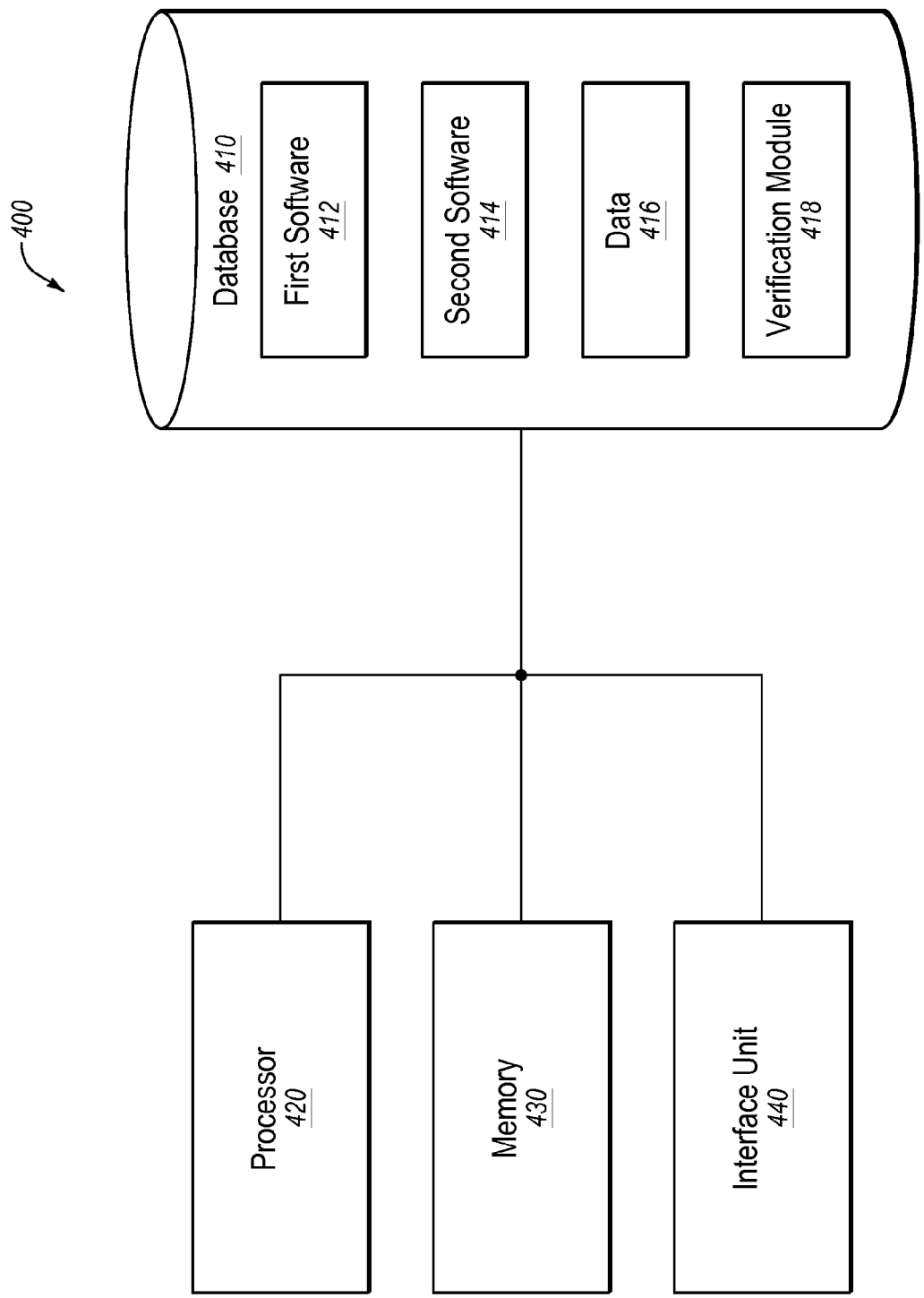
FIG. 4 is a block diagram of an example system configured to verify software.

FIG. 4 is a block diagram of an example system 400 configured to verify software, arranged in accordance with at least some embodiments described herein. The system 400 includes a database 410, a processor, 420, a memory 430, and an interface unit 440. The database 410, the processor 420, the memory 430, and the interface unit 440 may be communicatively coupled.

The database 410 may include first software 412, second software 414, data 416, and a verification module 418. The first software 412 may include a software program that includes multiple functions. The second software 414 may include a software program, the functions of which were previously clustered and verified as described herein. The data 416 may include data about the first and/or the second software 412 and 414.

The verification module 418 may include computer instructions, that when executed by a processor, such as the processor 420, may perform the functions and operations described herein. For example, the computer instructions may be configured when executed to analyze the first software 412, cluster functions from the first software 412 into clusters of functions, generate symbolic drivers for the clusters of functions, symbolically execute the first software 412 based on the symbolic drivers, and determine whether to re-cluster the functions of the first software 412 based on concrete test cases and coverage resulting from the symbolic execution of the first software 412. Accordingly, the verification module 418 may include and/or may correspond to the clustering module 130, the symbolic execution engine 150, and/or the decision module 170 of FIG. 1.

In some embodiments, the verification module 418 may include computer instructions that when executed use the data 416 to determine and/or execute a clustering strategy for the functions of the first software 412. For example, the data 416 may include information gathered about the first software 412 from a static analysis of the first software 412. In these and other embodiments, the data may include a number of lines of code of the first software 412, variable dependencies in the first software 412, function-calling dependencies in the first software 412, among other metric/information about the first software 412.

In some embodiments, the verification module 418 may include computer instructions that when executed select a clustering strategy for the first software 412 based on the second software 414. For example, the first software 412 may be compared to the second software 414 and when the first software 412 is analogous to the second software 414, the clustering strategy used for the second software 414 may be used as the clustering strategy for the first software 412.

The processor 420 may be configured to execute computer instructions from the verification module 418 that cause the processor 420 to perform the functions and operations described herein. The computer instructions may be loaded into the memory 430 for execution by the processor 420 and/or data generated, received, or operated on during performance of the functions and operations described herein may be at least temporarily stored in the memory 430. For example, the first software 412, the second software 414, the data 416, and/or portions of any or all of the foregoing may be temporarily stored in the memory 430 for use by the processor 420. The interface unit 440 may be configured to receive data from and/or to send data to other systems, users, and/or other processes over any type of communications network.

Modifications, additions, or omissions may be made to the system 400 without departing from the scope of the present disclosure. For example, the processor 420 may include a single processor or multiple processors that operate together. In these and other embodiments, the multiple processors may be physically located in the same location or located in separate locations that are networked together. Furthermore, the processor 420 may include a general-purpose processor or an application specific processor. Alternately or additionally, the processor 420 may include a dedicated processor or part of a field programmable gate array (FGPA) or some other type of device that is configured to execute computer instructions.

Figure 5:
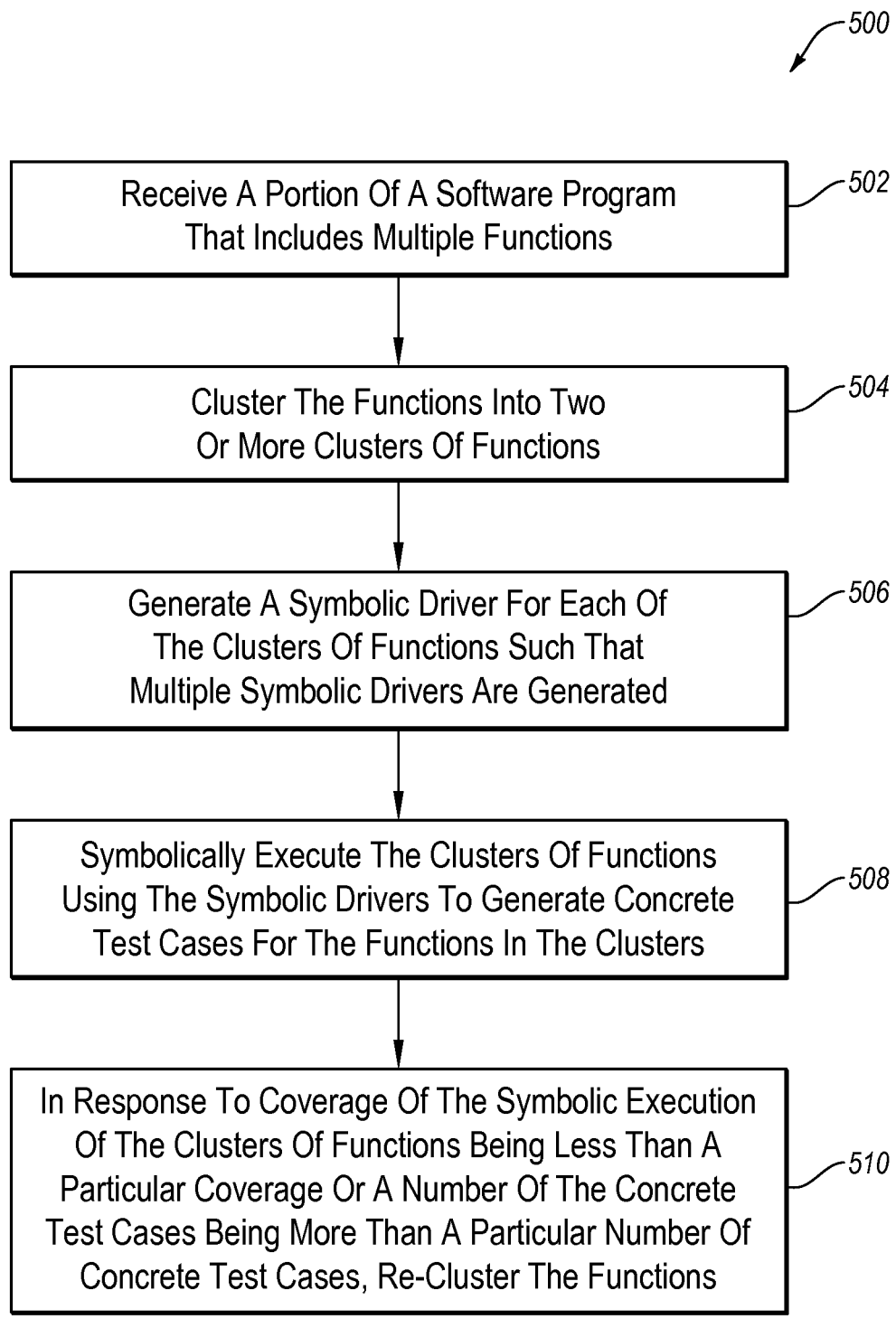
FIG. 5 illustrates a flow chart of another example method of verifying software.

FIG. 5 is a flow chart of an example method 500 of verifying software, arranged in accordance with at least some embodiments described herein. The method 500 may be implemented, in some embodiments, by a system, such as the system 100 or 400 of FIGS. 1 and 4. For instance, the processor 420 of the system 400 of FIG. 4 may be configured to execute computer instructions to perform operations to verify software as represented by one or more of blocks 502, 504, 506, 508, and/or 510 of the method 500. Although illustrated as discrete blocks, various blocks may be divided into additional blocks, combined into fewer blocks, or eliminated, depending on the desired implementation.

The method 500 may begin at block 502, where a portion of a software program that includes multiple functions may be received. In block 504, the functions may be clustered into two or more clusters of functions. In some embodiments, the functions may be clustered based on one or more clustering strategies. The clustering strategies may include calling dependencies between the functions, data variable dependencies between the functions, and shared data variables contained in conditional statements, among other strategies.

In block 506, a symbolic driver may be generated for each of the clusters of functions such that multiple symbolic drivers are generated. In block 508, the clusters of functions may be symbolically executed using the symbolic drivers to generate concrete test cases for the functions in the clusters In block 510, in response to the coverage of the symbolic execution of the clusters of functions being less than a particular coverage or a number of the concrete test cases being more than a particular number of concrete test cases, the functions may be re-clustered. In some embodiments, the functions may be re-clustered in response to the coverage of the symbolic execution of the clusters of functions being less than the particular coverage and the number of the concrete test cases being less than the particular number of concrete test cases.

In some embodiments, re-clustering the functions may include one or more of combining two or more of the clusters of functions, dividing one of the clusters of functions into two or more other clusters of functions, moving one or more functions from one of the clusters of functions to another of the clusters of functions, and clustering the functions based on a different clustering strategy than previously used.

In some embodiments, after the functions are re-clustered, the method 500 may repeat the blocks 506, 508, and 510 until the coverage of the symbolic execution of the clusters of functions is more than the particular coverage and the number of the concrete test cases is less than the particular number of concrete test cases.

The outlined acts and operations of FIG. 5 are only provided as examples, and some of the acts and operations may be optional, combined into fewer acts and operations, or expanded into additional acts and operations without detracting from the essence of the disclosed embodiments.

For example, the method 500 may further include selecting the clustering strategy based on the functions to be clustered. In some embodiments, selecting the clustering strategy may include identifying other functions analogous to the function to the clustered. The other functions may have been previously clustered, symbolically executed to generate second concrete test cases, and re-clustered until a second coverage of the previously clustered other functions is more than a second particular coverage and a second number of the second concrete test cases is less than a second particular number of concrete test cases. Selecting the clustering strategy may also include selecting the last clustering strategy applied to the previously clustered other functions when a number of re-clusterings of the previously clustered other functions to achieve the second coverage and the second number is less than a particular number of iterations. In these and other embodiments, the other functions may be identified to be analogous to the functions to be clustered based on one or more of: line count, cyclomatic complexity, instruction path length, connascene, and halstead complexity of the functions to be clustered and the other functions.

In some embodiments, the clusters of functions may be first clusters of functions. In these and other embodiments, in response to the coverage of the symbolic execution of the clusters of functions being less than the particular coverage and the number of the concrete test cases being less than the particular number of concrete test cases, the method may further include re-clustering the functions by clustering the functions into two or more second clusters of functions where the second clusters of functions include more clusters of functions than the first clusters of functions. Alternately or additionally, in response to the coverage of the symbolic execution of the clusters of functions being more than the particular coverage and the number of the concrete test cases being more than the particular number of concrete test cases, the method may further include re-clustering the functions by clustering the functions into two or more second clusters of functions where the second clusters of functions include less clusters of functions than the first clusters of functions.

The embodiments described herein may include the use of a special purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include non-transitory and/or tangible computer-readable storage media including RAM, ROM, EEPROM, CD-ROM or other optical disk storage, magnetic disk storage or other magnetic storage devices, or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions include, for example, instructions and data that cause a general-purpose computer, special purpose computer, or special purpose-processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" may refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A computer-implemented method of verifying software, the method comprising:
   receiving a portion of a software program that includes a plurality of functions;
   clustering the functions into two or more first clusters of functions;
   generating a symbolic driver for each of the first clusters of functions such that multiple symbolic drivers are generated;
   symbolically executing the first clusters of functions using the symbolic drivers to generate concrete test cases for the functions in the first clusters; and
   in response to coverage of the symbolic execution of the first clusters of functions being less than a particular coverage and a number of the concrete test cases being less than a particular number of concrete test cases, re-clustering the plurality of functions by clustering the plurality of functions into two or more second clusters of functions where the second clusters of functions include more clusters of functions than the first clusters of functions.

2. The computer-implemented method of claim 1, wherein re-clustering the functions includes one or more of: combining two or more of the first clusters of function, dividing one of the first clusters of functions into two or more of the second clusters of functions, and moving one or more functions from one of the first clusters of functions to another of the second clusters of functions.

3. The computer-implemented method of claim 1, wherein the functions are clustered based on one or more clustering strategies, the clustering strategies including: calling dependencies between the functions, data variable dependencies between the functions, and shared data variables contained in conditional statements.

4. The computer-implemented method of claim 3, further comprising selecting the clustering strategy based on the functions to be clustered, wherein the selecting the clustering strategy includes:
   identifying other functions analogous to the functions to be clustered, the other functions having been previously clustered, symbolically executed to generate second concrete test cases, and re-clustered until a second coverage of the symbolic execution of the previously clustered other functions is more than a second particular coverage and a second number of the second concrete test cases is less than a second particular number of concrete test cases; and
   selecting a previous clustering strategy applied to the previously clustered other functions as the clustering strategy when a number of re-clusterings of the previously clustered other functions to achieve the second coverage and the second number is less than a particular number of iterations.

5. The computer-implemented method of claim 4, wherein the other functions are identified to be analogous to the functions to be clustered based on one or more of: line count, cyclomatic complexity, instruction path length, connascene, and halstead complexity of the functions to be clustered and the other functions.

6. The computer-implemented method of claim 1, wherein after the functions are re-clustered, the method further comprises:
- generating a second symbolic driver for each of the second clusters of functions;
- symbolically executing the second clusters of functions using the second symbolic drivers to generate second concrete test cases for the functions in the second clusters; and
- in response to coverage of the symbolic execution of the second clusters of functions being less than the particular coverage and a number of the second concrete test cases being less than the particular number of concrete test cases or in response to the coverage of the symbolic execution of the second clusters of functions being more than the particular coverage and the number of the concrete test cases being more than the particular number of concrete test cases, re-clustering the plurality of functions into third clusters of functions that have a different number of clusters than the first clusters of functions and the second clusters of functions.

7. A computer-implemented method of verifying software, the method comprising:
- receiving a portion of a software program that includes a plurality of functions;
- clustering the functions into two or more first clusters of functions;
- generating a symbolic driver for each of the first clusters of functions such that multiple symbolic drivers are generated;
- symbolically executing the first clusters of functions using the symbolic drivers to generate concrete test cases for the functions in the first clusters; and
- in response to coverage of the symbolic execution of the first clusters of functions being more than a particular coverage and a number of the concrete test cases being more than a particular number of concrete test cases, the computer-implemented method further comprises re-clustering the functions by clustering the functions into two or more second clusters of functions where the second clusters of functions include less clusters of functions than the first clusters of functions.

8. The computer-implemented method of claim 7, wherein after the functions are re-clustered, the method further comprises:
- generating a second symbolic driver for each of the second clusters of functions;
- symbolically executing the second clusters of functions using the second symbolic drivers to generate second concrete test cases for the functions in the second clusters; and
- in response to coverage of the symbolic execution of the second clusters of functions being less than the particular coverage and a number of the second concrete test cases being less than the particular number of concrete test cases or in response to the coverage of the symbolic execution of the second clusters of functions being more than the particular coverage and the number of the concrete test cases being more than the particular number of concrete test cases, re-clustering the plurality of functions into third clusters of functions that have a different number of clusters than the first clusters of functions and the second clusters of functions.

9. The computer-implemented method of claim 7, wherein re-clustering the functions includes one or more of: combining two or more of the first clusters of functions, dividing one of the first clusters of functions into two or more of the second clusters of functions, and moving one or more functions from one of the first clusters of functions to another of the second clusters of functions.

10. The computer-implemented method of claim 7, wherein the functions are clustered based on one or more clustering strategies, the clustering strategies including: calling dependencies between the functions, data variable dependencies between the functions, and shared data variables contained in conditional statements.

11. The computer-implemented method of claim 10, further comprising selecting the clustering strategy based on the functions to be clustered, wherein the selecting the clustering strategy includes:
- identifying other functions analogous to the functions to be clustered, the other functions having been previously clustered, symbolically executed to generate second concrete test cases, and re-clustered until a second coverage of the symbolic execution of the previously clustered other functions is more than a second particular coverage and a second number of the second concrete test cases is less than a second particular number of concrete test cases; and
- selecting a previous clustering strategy applied to the previously clustered other functions as the clustering strategy when a number of re-clusterings of the previously clustered other functions to achieve the second coverage and the second number is less than a particular number of iterations.

12. The computer-implemented method of claim 11, wherein the other functions are identified to be analogous to the functions to be clustered based on one or more of: line count, cyclomatic complexity, instruction path length, connascene, and halstead complexity of the functions to be clustered and the other functions.

13. A processor configured to execute computer instructions to cause a system to perform operations for verifying software, the operations comprising:
- receiving a portion of a software program that includes a plurality of functions;
- clustering the functions into two or more first clusters of functions;
- generating a symbolic driver for each of the first clusters of functions such that multiple symbolic drivers are generated;
- symbolically executing the first clusters of functions using the symbolic drivers to generate concrete test cases for the functions in the first clusters; and
- in response to coverage of the symbolic execution of the first clusters of functions being less than a particular coverage and a number of the concrete test cases being less than a particular number of concrete test cases, re-clustering the plurality of functions by clustering the plurality of functions into two or more second clusters of functions where the second clusters of functions include more clusters of functions than the first clusters of functions.

14. The processor of claim 13, wherein re-clustering the functions includes one or more of: combining two or more of the first clusters of functions, dividing one of the first clusters of functions into two or more of the second clusters of functions, and moving one or more functions from one of the first clusters of functions to another of the second clusters of functions.

15. The processor of claim 13, wherein the functions are clustered based on one or more clustering strategies, the clustering strategies including: calling dependencies between the functions, data variable dependencies between the functions, and shared data variables contained in conditional statements.

16. The processor of claim 15, wherein the operations further comprise selecting the clustering strategy based on the functions to be clustered, wherein the selecting the clustering strategy includes:
  identifying other functions analogous to the functions to be clustered, the other functions having been previously clustered, symbolically executed to generate second concrete test cases, and re-clustered until a second coverage of the symbolic execution of the previously clustered other functions is more than a second particular coverage and a second number of the second concrete test cases is less than a second particular number of concrete test cases; and
  selecting a previous clustering strategy applied to the previously clustered other functions as the clustering strategy when a number of re-clusterings of the previously clustered other functions to achieve the second coverage and the second number is less than a particular number of iterations.

17. The processor of claim 16, wherein the other functions are identified to be analogous to the functions to be clustered based on one or more of: line count, cyclomatic complexity, instruction path length, connascene, and halstead complexity of the functions to be clustered and the other functions.

18. The processor of claim 13, wherein after the functions are re-clustered, the operations further comprise:
  generating a second symbolic driver for each of the second clusters of functions;
  symbolically executing the second clusters of functions using the second symbolic drivers to generate second concrete test cases for the functions in the clusters; and
  in response to coverage of the symbolic execution of the second clusters of functions being less than the particular coverage and a number of the second concrete test cases being less than the particular number of concrete test cases or in response to the coverage of the symbolic execution of the second clusters of functions being more than the particular coverage and the number of the concrete test cases being more than the particular number of concrete test cases, re-clustering the plurality of functions into third clusters of functions that have a different number of clusters than the first clusters of functions and the second clusters of functions.

\* \* \* \* \*